(12) United States Patent
Hsien

(10) Patent No.: US 6,843,442 B2
(45) Date of Patent: Jan. 18, 2005

(54) SIMPLE WINDLASS TOOL ASSEMBLY DEVICE

(76) Inventor: Cheng-Wen Hsien, P.O. Box No. 6-57, Chung-Ho, Taipei (TW), 235

( * ) Notice: Subject to any disclaimer, the term of this patent is extended or adjusted under 35 U.S.C. 154(b) by 0 days.

(21) Appl. No.: 10/205,417

(22) Filed: Jul. 26, 2002

(65) Prior Publication Data

US 2004/0016841 A1 Jan. 29, 2004

(51) Int. Cl.$^7$ ............................................... B65H 75/42
(52) U.S. Cl. ...................................................... 242/392
(58) Field of Search .......................... 242/392; 254/323, 254/328

(56) References Cited

U.S. PATENT DOCUMENTS 3,820,734 A * 6/1974 Selliken ...................... 242/392
3,917,228 A * 11/1975 Blum .......................... 242/392
4,767,081 A * 8/1988 Lau ............................. 242/392
5,115,994 A * 5/1992 Hershberger ................ 242/392

* cited by examiner

Primary Examiner—John M. Jillions
(74) Attorney, Agent, or Firm—Troxell Law Office PLLC

(57) ABSTRACT

A simple windlass tool assembly device includes a position limiting plate, two fastening rods and a rope, wherein two through holes of the position limiting plate are disposed on two corresponding positioning portions on a wheel frame of a vehicle; the fastening rod is respectively inserted into the through hole of the position limiting plate with one end locked at the locking end on the positioning portion and the other end limiting the stop end of the position limiting plate; one end of the rope is fastened onto the two fastening rods and the other end is fastened to a proper fixed object in a nearby area. By virtue of this application, the driving rotation of the wheel tires wind the rope on the two fastening rods to enable the wheel tires to fast move away from the hole so as to achieve the objective of trap-escape and self-rescue.

2 Claims, 3 Drawing Sheets

SIMPLE WINDLASS TOOL ASSEMBLY DEVICE

BACKGROUND OF THE INVENTION

1) Field of the Invention

The present invention relates to a simple windlass tool assembly device, more especially to a simple windlass tool assembly device provided for drivers to move vehicles from holes or escape from traps by themselves and convenient for application and carry.

2) Description of the Prior Art

Accordingly, in the modern era, the number of various kinds of vehicles keeps increasing. In addition to the most private cars, the number of vans, jeeps, pick-ups and trucks is also increasing annually. It is quite often to drive by a hole or to spin on the road. Without other vehicles around, a driver usually choose to drive around the hole and prevent any damage to the vehicle. However, with other vehicles passing closely by, to avoid the hole might scratch the other vehicles and that is not worthwhile. Therefore, for the sake of safety and no enough time for braking, the only alternative for the driver is to drive toward the hole.

Usually, a regular wheel tire won't be trapped in a small and shallow hole; however, the digging or crushing from vehicles of heavy tons might form lager and deeper holes in the pavement area with weak strength and that might cause the trapped vehicle hard to get out but spinning.

With people and other vehicles around, the driver usually has no problem in getting help for moving the trapped vehicle. However, if the vehicle is trapped in a suburban area with less population, then the driver has to try to move the vehicle by him/herself while asking or waiting for rescue. Usually, what the driver can do is to insert a long wooden plate into the hole to guide the turning wheels to move out of the hole.

However, the premise of using a wooden plate for guiding the vehicle is to be able to find a wooden plate. It is not that easy sometimes to find one. Therefore, to design a simple windlass tool assembly device capable of being operated by the driver alone as well as convenient for application and carrying should be very helpful to the driver.

Therefore, the inventor of the present invention has successfully researched and developed the present invention of a simple windlass tool assembly device after continuous studies and experiments as well as basing on years of practical experience in researching, designing and manufacturing the related products, so as to eliminate the difficulties of asking for rescue, waiting for a long time and rescuing the vehicle by the driver alone.

SUMMARY OF THE INVENTION

Specifically, the present invention of the simple windlass tool assembly device comprises a position limiting plate, two fastening rods and a rope, wherein two through holes of the position limiting plate are disposed on two corresponding positioning portions on a wheel frame of a vehicle; the fastening rod is respectively inserted into the through hole of the position limiting plate with one end locked at the locking end on the positioning portion and the other end limiting the stop end of the position limiting plate; one end of the rope is fastened onto the two fastening rods and the other end thereof is fastened to a proper fixed object in a nearby area.

Therefore, the primary objective of the present invention is to assemble the simple windlass tool assembly device onto a vehicle wheel frame to wind the rope on the two fastening rods through the driving rotation of the wheel tires to fast move the vehicle from the hole so as to achieve the objective of trap-escape and self-rescue.

To enable a further understanding of the other objectives and the structural features of the present invention, the brief description of the drawings below is followed by the detailed description of the preferred embodiment.

DETAILED DESCRIPTION OF THE PREFERRED EMBODIMENTS

Figure 1:
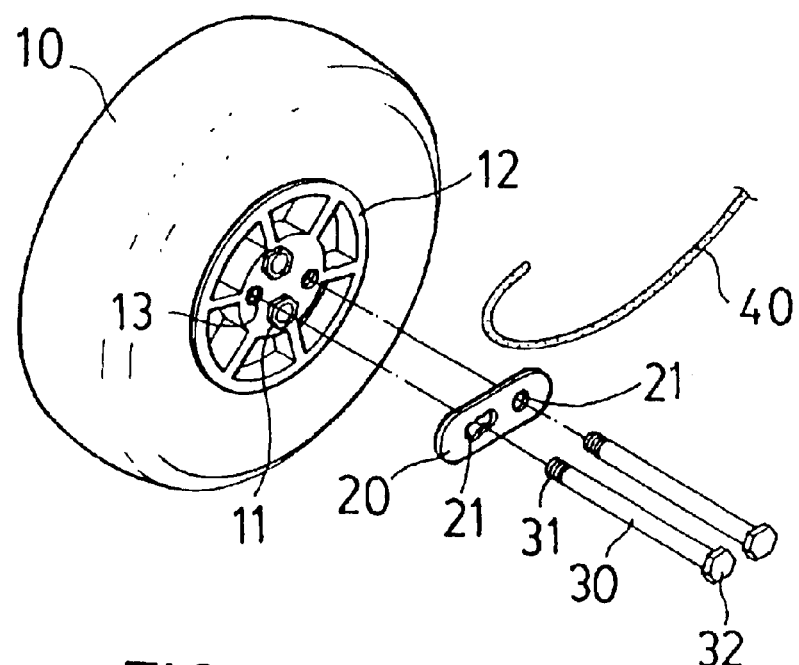
FIG. 1 is a schematic drawing of the structure of the present invention.
Figure 2:
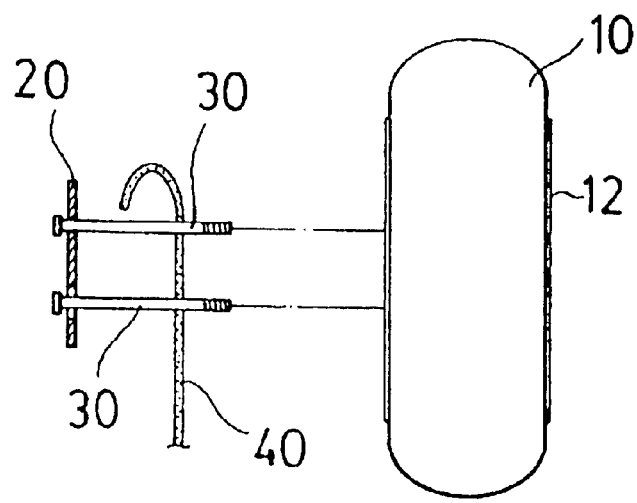
FIG. 2 is a status drawing of assembling the present invention onto a wheel tire.
Figure 3:
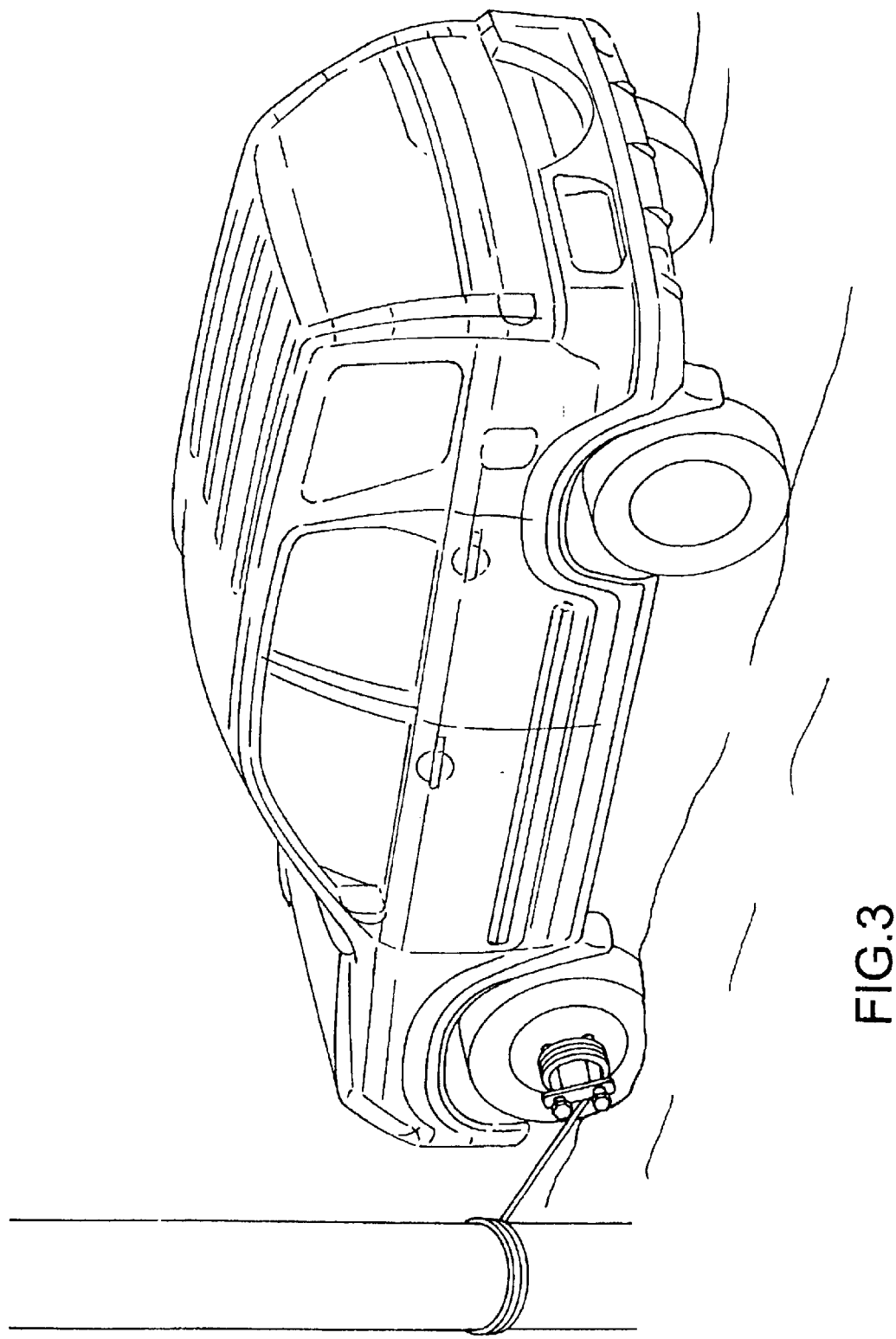
FIG. 3 is a status drawing of implementing the present invention.

As indicated from FIGS. 1 to 3, a regular wheel tire (10) is fastened onto a vehicle at a positioning portion (13) at the center of the shaft area of a wheel frame (12) through a plurality of fastening members (11); the present invention of a simple windlass tool assembly device is also installed on the wheel frame (12) thereby capable of moving the driving wheel tires away from the hole so as to achieve the objective of trap-escape and self-rescue.

The simple windlass tool assembly device comprises a position limiting plate (20) which is disposed on the outer side of the wheel frame (12) and has a through hole (21) corresponding to the position portion (13) of the wheel frame (12); two fastening rods (30) are respectively inserted into the through holes (21) on the position limiting plate (20); one end of the fastening rod (30) is a locking end (31) and the other end is a stop end (32); wherein the locking end (31) is locked on the corresponding position portion (13) on the wheel frame (12) and the stop end (32) limits the position limiting plate (20). A rope (40) with one end fixedly coiled onto two fastening rods (30) disposed between the wheel frame (12) and the position plate (20); the other end thereof is fastened onto a proper fixed object, such as an electricity wire pole, a big tree, etc., in the nearby area.

By virtue of the simple windlass tool assembly device, when a vehicle is unable to drive away from a hole due to the stuck wheel tires (10), the driver only has to detach the two corresponding fastening members (11) on the wheel frame (12) from the position portions (13) and then inserts two fastening rods (30) on the position limiting plate (20) respectively onto the position portions (13) for fastening. After one end of the rope (40) is fastened onto the two fastening rods (30) and the other end thereof is fastened onto a fixed object in a proper area, the continuous driving rotation of the wheel tires (10) winds the rope (40) on the two fastening rods (30); the winding of the rope (40) enables the wheel tires (10) to rapidly move away from the hole so as to achieve the objective of trap-escape and self-rescue.

Furthermore, in order to meet the different interval distance between the two corresponding position portions (13)

on the wheel frame (12), the through holes (21) disposed on the position limiting plate (20) of the present invention is of a ring-type structure with adjustable positioning function to match with the interval distance of the two corresponding position portions (13) thereby achieving the objective of increasing the popular application.

Figure 4:
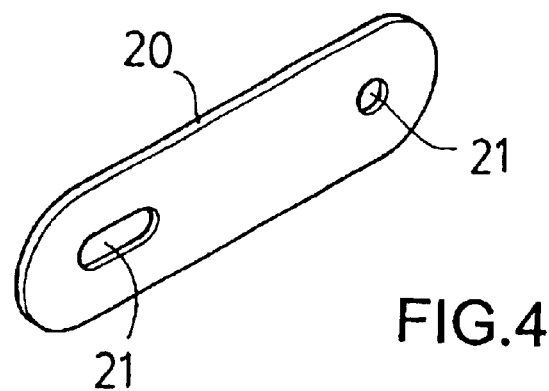
FIG. 4 is a schematic drawing of another exemplary embodiment of a position limiting plate of the present invention.

As indicated in FIG. 4, the through holes (21) of the position limiting plate (20) are structured not only as a plurality of rings, but also as long slots thereby more specifically adjusting and fixing the two fastening rods (30) to match the interval distance between two corresponding position portions (13).

Figure 5:
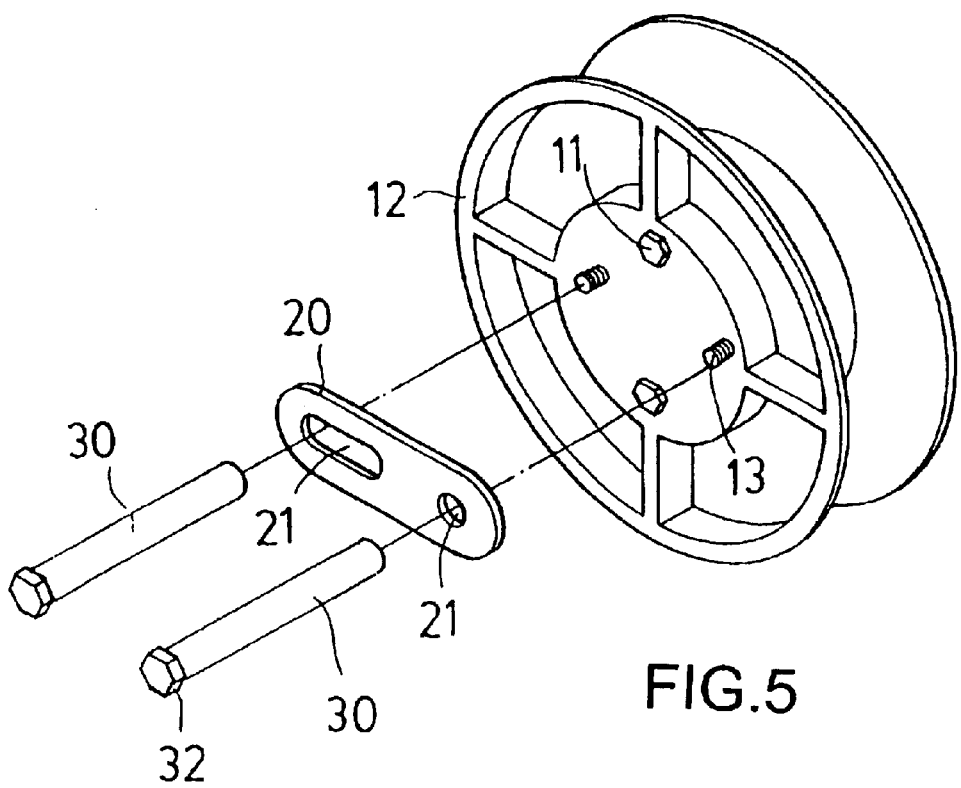
FIG. 5 is a schematic drawing of another exemplary embodiment of a fastening rod of the present invention.
Figure 6:
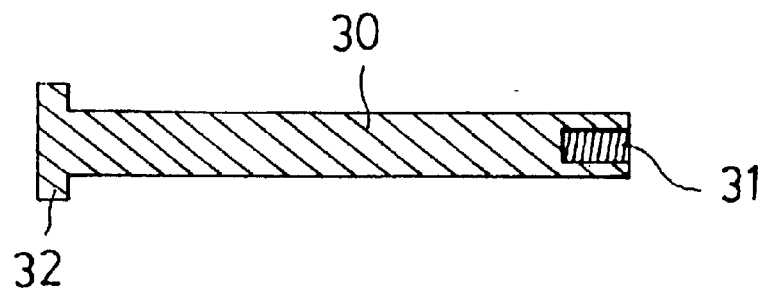
FIG. 6 is a cross-sectional drawing of the fastening rod shown in FIG. 5.

As indicated in FIGS. 5 and 6, in order to meet the different types of the position portions (13) of Japanese and European vehicles, one end of the fastening rod (30) of the simple windlass tool assembly device of the present invention is locked to the locking end (31) on the corresponding position portions (13) of the wheel frame (12) and the other end thereof limits the stop end (32) of the position limiting plate (20).

In summation of the abovementioned, the present invention of the simple windlass tool assembly device not only allows the driver to self-rescue the vehicle for moving the stuck wheel tires away from the hole, but also conveniences the storage in a tool bag, the application and carrying.

It is of course to be understood that the embodiment described herein is merely illustrative of the principles of the invention and that a wide variety of modifications thereto may be effected by persons skilled in the art without departing from the spirit and scope of the invention as assembly forth in the following claims.

What is claimed is:

1. A windlass tool assembly device for use with a wheel frame having a plurality of positioning portions comprising:

a) an elongated position limiting plate being a rectangular plate with curved ends and having two through holes, each of the two through holes located on one of two opposing ends;

b) two fastening rods, each fastening rod having a locking end and a stop end located on opposite ends thereof, each locking end inserted through one of the two through holes in the elongated position limiting plate and connected to one of the positioning portions of the wheel frame, each of the stop ends limiting movement of the position limiting plate; and c) a rope connected at one end thereof to at least one of the two fastening rods, wherein the rope is coiled around the two fastening rods between the position limiting plate and the wheel frame by rotation of the wheel frame.

2. The windlass tool assembly device according to claim 1, wherein the two through holes in the elongated position limiting plate include one round hole and one slot.

* * * * *